US008831656B2

(12) United States Patent  
Ke et al.

(10) Patent No.: US 8,831,656 B2
(45) Date of Patent: Sep. 9, 2014

(54) METHOD AND SYSTEM FOR MAPPING LOGICAL CHANNEL TO MAC FLOW

(75) Inventors: Yazhu Ke, Shenzhen (CN); Jianwu Dou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 199 days.

(21) Appl. No.: 13/257,880

(22) PCT Filed: Jan. 14, 2010

(86) PCT No.: PCT/CN2010/070190
§ 371 (c)(1),
(2), (4) Date: Mar. 14, 2012

(87) PCT Pub. No.: WO2010/145212
PCT Pub. Date: Dec. 23, 2010

(65) Prior Publication Data

US 2012/0163308 A1    Jun. 28, 2012

(30) Foreign Application Priority Data

Sep. 29, 2009    (CN) .......................... 2009 1 0176384

(51) Int. Cl.
*H04B 7/00*        (2006.01)
*H04L 5/00*        (2006.01)
*H04W 72/04*       (2009.01)

(52) U.S. Cl.
CPC ........... *H04L 5/0053* (2013.01); *H04W 72/042* (2013.01)
USPC ........... 455/509; 370/252; 370/310; 370/318; 370/328; 370/329

(58) Field of Classification Search
CPC ..... H04W 84/08; H04W 28/04; H04W 88/08; H04W 52/24; H04W 52/50; H04W 52/16
USPC .................. 455/509; 370/318, 328, 329, 394, 370/395.4, 395.42, 469, 310
See application file for complete search history.

(56) References Cited

U.S. PATENT DOCUMENTS 7,408,895 B2 *    8/2008    Zhang et al. .................. 370/318
8,081,595 B2 *    12/2011   Zhang et al. .................. 370/318

(Continued)

FOREIGN PATENT DOCUMENTS

CN    101155416 A    4/2008
CN    101404539 A    4/2009

(Continued)

OTHER PUBLICATIONS

International Search Report in international application No. PCT/CN2009/075907, mailed on Apr. 1, 2010.

(Continued)

*Primary Examiner* — William D Cumming
(74) *Attorney, Agent, or Firm* — Oppedahl Patent Law Firm LLC

(57) ABSTRACT

The present disclosure discloses a method for mapping a logical channel to a Media Access Control (MAC) flow, the method includes: a Radio Network Controller (RNC) informs a User Equipment (UE) of corresponding relationship between a Common Control Channel (CCCH) and an Enhanced-Dedicated Channel (E-DCH) MAC flow through signaling; the UE receives the signaling, and obtains the corresponding relationship between the CCCH and the E-DCH MAC flow. The present disclosure further discloses a system for mapping a logical channel to an MAC flow. Through the method and system disclosed in the present disclosure, it is convenient for both a Node B (NodeB) and UE can accurately obtain the corresponding relationship between the CCCH and the E-DCH MAC flow, which ensures the NodeB decodes correctly, thus improving the success rate in receiving signaling and data.

14 Claims, 2 Drawing Sheets

(56) References Cited

U.S. PATENT DOCUMENTS

| | | | |
|---|---|---|---|
| 8,121,048 B2* | 2/2012 | Chen et al. | 370/252 |
| 8,179,836 B2* | 5/2012 | Terry et al. | 370/328 |
| 8,542,688 B2* | 9/2013 | Choi et al. | 370/395.42 |
| 2006/0209896 A1* | 9/2006 | Choi et al. | 370/469 |
| 2006/0268884 A1* | 11/2006 | Terry et al. | 370/394 |
| 2007/0115871 A1* | 5/2007 | Zhang et al. | 370/318 |
| 2007/0155414 A1* | 7/2007 | Zhuang | 455/509 |
| 2007/0293224 A1 | 12/2007 | Wang et al. | |
| 2008/0170516 A1* | 7/2008 | Carmon et al. | 370/310 |
| 2008/0273483 A1* | 11/2008 | Zhang et al. | 370/318 |
| 2009/0059929 A1* | 3/2009 | Lee | 370/395.4 |
| 2009/0097444 A1* | 4/2009 | Lohr et al. | 370/329 |
| 2009/0225711 A1 | 9/2009 | Sammour et al. | |
| 2010/0105405 A1 | 4/2010 | Vujcic | |
| 2011/0134829 A1* | 6/2011 | Chen et al. | 370/328 |
| 2012/0163308 A1* | 6/2012 | Ke et al. | 370/329 |
| 2012/0170527 A1* | 7/2012 | Ke et al. | 370/329 |

FOREIGN PATENT DOCUMENTS

| | | | |
|---|---|---|---|
| CN | 101489305 A | | 7/2009 |
| CN | 101500276 A | | 8/2009 |
| EP | 2068582 A1 | | 6/2009 |
| JP | 2008022561 A | | 1/2008 |
| WO | 2006110072 A1 | | 10/2006 |
| WO | 2008096408 A1 | | 8/2008 |
| WO | 2008114983 A2 | | 9/2008 |
| WO | 2009055804 A2 | | 4/2009 |
| WO | 2009097273 A1 | | 8/2009 |

OTHER PUBLICATIONS

English Translation of the Written Opinion of the International Search Authority in international application No. PCT/CN2009/075907, mailed on Apr. 1, 2010.

Technical Specification Group Radio Access Network Jun. 30, 2007.

International Search Report in international application No. PCT/CN2010/070190, mailed on Jul. 8, 2010.

English Translation of the Written Opinion of the International Search Authority in international application No. PCT/CN2010/070190, mailed on Jul. 8, 2010.

"Radio Interface Protocol Architecture(Release 8)", 3GPP TS 25.301 V8.5.0, Mar. 2009.

"Medium Access Control (MAC) protocol specification(Release 8)", 3GPP TS 25.321 V8.6.0, Jun. 2009.

"Enhanced uplink;Overall description;Stage 2(Release 9)", 3GPP TS 25.319 V9.0.0, Jun. 2009.

"Reply LS on Enhanced Uplink for CELL_FACH state in FDD", 3GPP TSG-RAN-WG2 Meeting #60, Tdoc R2-075472, Nov. 9, 2007.

3GPP TS 25.301 V5.1.0, 3rd Generation Partnership Project; Technical Specification Group Radio Access Network; Radio Interface Protocol Architecture (Release 5), Jun. 1, 2002, see European Search Report.

Supplementary European Search Report in European application No. 10788608.7, mailed on Feb. 5, 2014.

3GPP TS 25.331 V8.7.0, 3rd Generation Partnership Project; Technical Specification Group Radio Access Network; Radio Resource Control (RRC); Protocol Specification (Release 8), Jun. 2009.

* cited by examiner

METHOD AND SYSTEM FOR MAPPING LOGICAL CHANNEL TO MAC FLOW

TECHNICAL FIELD

The present disclosure relates to the delay processing technology in mobile communications, especially relates to a method and system for mapping a logical channel to a Media Access Control (MAC) flow.

BACKGROUND

Two basic working modes of mobile User Equipment (UE) are an IDLE mode and a connection mode. The IDLE mode refers to the state that the UE is on standby and no services exit; and the connection mode refers to the state that a Radio Resource Control (RRC) connection has been established between a UE and a Radio Network Controller (RNC), here the UE has resided in a cell. Under the connection mode, the UE has four states, which are a Cell_DCH state, a Cell_FACH state, a Cell_PCH state and a URA_PCH state. the Cell_DCH state refers to the state that the UE performs communication using a dedicated channel; the Cell_FACH state refers to the state that the UE completes transmission of a small amount of data, needing no allocated dedicated channels, and transmits messages on a common Forward Access Channel (FACH)/Random Access Channel (RACH); the Cell_PCH state refers to the state that the UE has no data to transmit, only monitoring a paging indicator message on a Paging Indicator Channel (PICH) in the downstream direction; the URA_PCH state refers to the state that the UE is in a discontinuous-receiving state and monitors PICH messages in a Universal Terrestrial Radio Access Network (UTRAN) Registration Area (URA).

With the evolution of mobile communication systems, improving user traffic Quality Of Service (QoS) has become the primary objective of operators, traffic QoS affects service performance, and further determines user satisfaction with the service. One important aspect of improving user QoS is to decrease the time delays of connection establishment and channel allocation process, e.g. uplink and downlink signaling delay. As to the problem of the downlink signaling delay in the CELL_FACH state, CELL_PCH state and URA_PCH state, the problem is solved by introducing high speed downlink packet access (HDSPA) in the $3^{rd}$ Generation Partnership Project (3GPP) standard; as to the problem of the uplink signaling delay, the problem is solved by introducing an Enhanced Dedicated Channel (E-DCH) used in the CELL_FACH state and Idle mode in the 3GPP standard.

In order to decrease uplink signaling delay, the following aspects need to be considered:

1. decreasing the waiting time for the user plane and control plane in the IDLE mode, CELL_FACH state, CELL_PCH state and URA_PCH state;

2. increasing the peak rate in the CELL_FACH state;

3. decreasing the migration delay among the IDLE mode, CELL_FACH state, CELL_PCH state, URA_PCH state and CELL_DCH state.

To achieve the above objective, a High Speed Uplink Packet Access (HSUPA) mode, which is further called an uplink enhanced CELL_FACH technology, may be introduced in the Idle mode and CELL_FACH state. The principle of the uplink enhanced CELL_FACH technology is: sending of random accesses still uses the random access process of a Packet Random Access Channel (PRACH), but the channel type changes, that is, the E-DCH may be used in the IDLE mode and CELL_FACH state; a Common Control Channel (CCCH)/Dedicated Control Channel (DCCH)/Dedicated Traffic Channel (DTCH) may be mapped to the E-DCH to be sent.

Currently, a Uu interface of 3GPP protocols defines an E-DCH Media Access Control (MAC) flow used in the IDLE mode and CELL_FACH state, the E-DCH MAC flow includes the following information: E-DCH MAC flow power offset, E-DCH MAC flow maximum number of retransmissions and whether Protocol Data Units (PDUs) of different MAC flows can be multiplexed into one MAC-i PDU.

When the UE sends data on the E-DCH, it firstly needs to determine which MAC flow a logical channel is mapped to, and then determine the E-DCH MAC flow power offset, used for sending data, E-DCH MAC flow maximum number of retransmissions and a multiplexing indicator between different E-DCH MAC flows, which indicates PDUs of which MAC flows can be multiplexed into one MAC-i PDU at one Transmit Time Interval (TTI).

However, it is not prescribed how a network side informs a UE of the mapping relation indicating which E-DCH MAC flow different logical channels are mapped to in exiting protocols; for the DCCH/DTCH, the information can be informed of through Radio Bearer (RB) mapping information (RB mapping info), but for the situation that the CCCH is mapped to the E-DCH, the UE cannot determine to choose which E-DCH MAC flow to use, and further cannot uniquely choose which Hybrid Automatic Repeat Request (HARQ) profile to use, this will cause inconsistence of HARQ profile information used by the UE and NodeB, leading to decoding error finally. The HARQ profile refers to a protocol configuration file comprising HARQ power offset and maximum number of retransmissions, and there is one-to-one corresponding relationship between an exiting HARQ profile and an identification of an E-DCH MAC flow.

SUMMARY

Based on the above description, the present disclosure aims to provide a method and system for mapping a logical channel to an MAC flow, for the convenience that both a NodeB and UE can obtain the corresponding relationship between a CCCH and an E-DCH MAC flow accurately.

To achieve the above objective, the technical solution of the present disclosure is realized in the following way.

The present provides a method for mapping a logical channel to a Media Access Control (MAC) flow, the method includes:

a Radio Network Controller (RNC) informs a User Equipment (UE) of corresponding relationship between a Common Control Channel (CCCH) and an Enhanced Dedicated Channel (E-DCH) MAC flow through signaling;

the UE receives the signaling, and obtains the corresponding relationship between the CCCH and the E-DCH MAC flow.

This method may further include: the signaling may include an identification of the E-DCH MAC flow corresponding to the CCCH, and the UE may obtain at least one of the following parameters according to the identification:

E-DCH MAC flow power offset corresponding to an identification, E-DCH MAC flow maximum number of retransmissions and a multiplexing indicator between different E-DCH MAC flows.

The signaling may be system broadcasting message 5 and/or system broadcasting message 5*bis*.

The present disclosure further provides a method for mapping a logical channel to a Media Access Control (MAC) flow, the method includes:

an RNC informs a UE of at least one of the following parameters of an E-DCH MAC flow used by a CCCH through signaling: E-DCH MAC flow power offset, E-DCH MAC flow maximum number of retransmissions and a multiplexing indicator between different E-DCH MAC flows;

the UE obtains at least one of the following parameters of the E-DCH MAC flow used by the CCCH from the signaling: E-DCH MAC flow power offset, E-DCH MAC flow maximum number of retransmissions and a multiplexing indicator between different E-DCH MAC flows.

The signaling may be system broadcasting message 5 and/or system broadcasting message 5bis.

The present disclosure further provides a method for mapping a logical channel to a Media Access Control (MAC) flow, the method includes:

an RNC and a UE predetermines an identification of an E-DCH MAC flow used by a CCCH;

the UE obtains at least one of the following parameters corresponding to the identification from signaling sent by the RNC according to the identification of the E-DCH MAC flow used by the CCCH: E-DCH MAC flow power offset, E-DCH MAC flow maximum number of retransmissions and a multiplexing indicator between different E-DCH MAC flows.

The signaling may be system broadcasting message 5 and/or system broadcasting message 5bis.

The present disclosure further provides a system for mapping a logical channel to a Media Access Control (MAC) flow, the system includes an RNC and a UE, wherein the RNC is configured to inform the UE of corresponding relationship between a CCCH and an E-DCH MAC flow through signaling;

the UE is configured to receive the signaling, and obtain the corresponding relationship between the CCCH and the E-DCH MAC flow.

The RNC may make an identification of the E-DCH MAC flow contained in the signaling, wherein the E-DCH MAC flow is corresponding to the CCCH, the UE may obtain at least one of the following parameters according to the identification:

E-DCH MAC flow power offset corresponding to an identification, E-DCH MAC flow maximum number of retransmissions and a multiplexing indicator between different E-DCH MAC flows.

The signaling may be system broadcasting message 5 and/or system broadcasting message 5bis.

The present disclosure further provides a system for mapping a logical channel to a Media Access Control (MAC) flow, the system includes an RNC and a UE, wherein the RNC is configured to inform the UE of at least one of the following parameters of an E-DCH MAC flow used by a CCCH through signaling: E-DCH MAC flow power offset, E-DCH MAC flow maximum number of retransmissions and a multiplexing indicator between different E-DCH MAC flows;

the UE is configured to obtain at least one of the following parameters of the E-DCH MAC flow used by the CCCH from the signaling: E-DCH MAC flow power offset, E-DCH MAC flow maximum number of retransmissions and a multiplexing indicator between different E-DCH MAC flows.

The signaling may be system broadcasting message 5 and/or system broadcasting message 5bis.

The present disclosure further provides a system for mapping a logical channel to a Media Access Control (MAC) flow, the system includes an RNC and a UE, wherein the RNC is configured to predetermine an identification, with the UE, of an E-DCH MAC flow used by a CCCH;

the UE is configured to predetermine the identification, with the RNC, of the E-DCH MAC flow used by the CCCH and obtain at least one of the following parameters corresponding to the identification from the signaling sent by the RNC according to the identification: E-DCH MAC flow power offset, E-DCH MAC flow maximum number of retransmissions and a multiplexing indicator between different E-DCH MAC flows.

The signaling may be system broadcasting message 5 and/or system broadcasting message 5bis.

Through the method and system for mapping a logical channel to an MAC flow provided in the present disclosure, an RNC informs a UE of corresponding relationship between a CCCH and an E-DCH MAC flow through signaling, or directly informs the UE of the power offset and/or maximum number of retransmissions of the E-DCH MAC flow used by the CCCH, therefore it is convenient that both the NodeB and UE can obtain the corresponding relationship between the CCCH and the E-DCH MAC flow accurately, ensuring that the NodeB decodes correctly and improving the success rate in receiving the signaling and data.

DETAILED DESCRIPTION

Below the technical solution of the present disclosure will be illustrated in details in combination with the accompanying drawings and specific embodiments.

Figure 1:
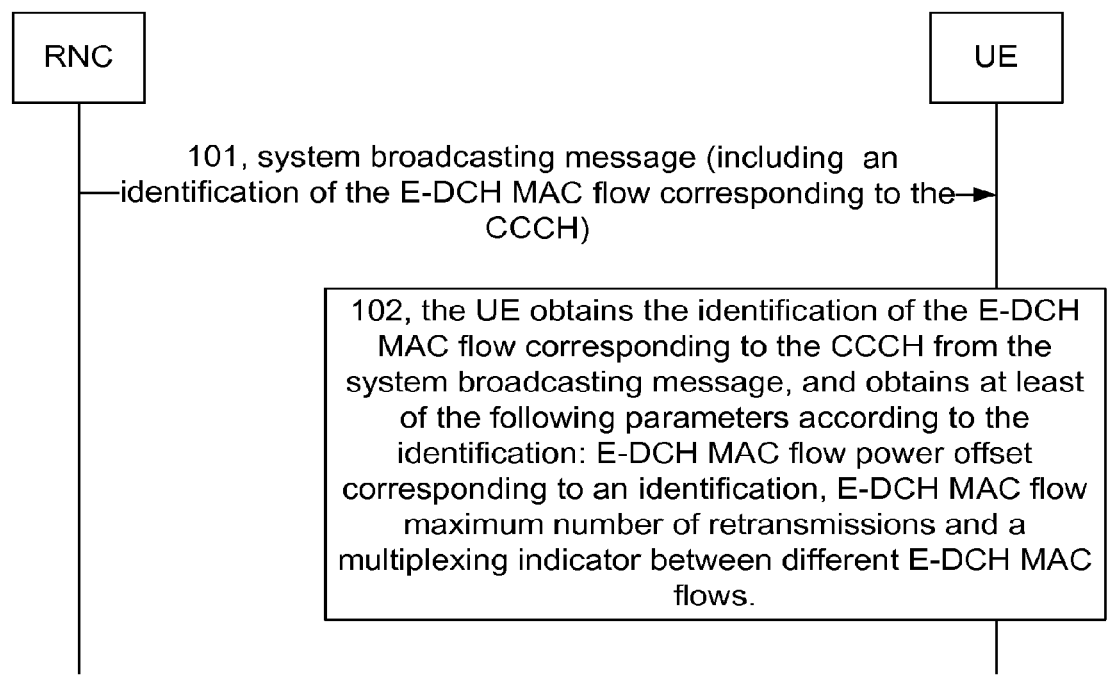
FIG. 1 is a flowchart 1 illustrating a method for mapping a logical channel to an MAC flow according to the present disclosure.

The method for mapping a logical channel to an MAC flow provided in the present disclosure, as shown in FIG. 1, mainly includes the following steps.

Step 101, an RNC informs a UE of corresponding relationship between a CCCH and an E-DCH MAC flow through signaling.

The signaling may be system broadcasting messages, such as system broadcasting message 5 and/or system broadcasting message 5bis. The corresponding relationship between the CCCH and the E-DCH MAC flow in the present disclosure refers to that an identification of the E-DCH MAC flow corresponding to the CCCH is provided in the signaling.

Step 102, the UE receives the signaling, and obtains the corresponding relationship between the CCCH and the E-DCH MAC flow.

Since corresponding relationship between an identification of an E-DCH MAC flow and an HARQ profile (including at least one of the following: E-DCH MAC flow power offset, E-DCH MAC flow maximum number of retransmissions and a multiplexing indicator between different E-DCH MAC flows) is also informed to the UE through the system broadcasting message 5 and/or system broadcasting message 5bis, thus the UE can obtain at least one of the following parameters from the corresponding HARQ profile according to the identification of the E-DCH MAC flow in the signaling:

E-DCH MAC flow power offset corresponding to an identification, E-DCH MAC flow maximum number of retransmissions and a multiplexing indicator between different E-DCH MAC flows.

Figure 2:
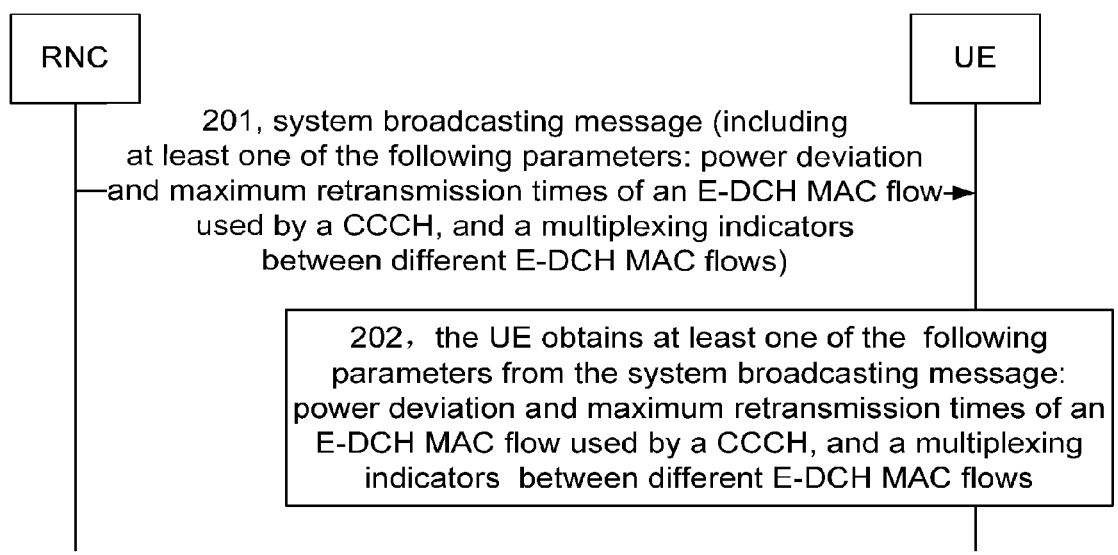
FIG. 2 is a flowchart 2 illustrating a method for mapping a logical channel to an MAC flow according to the present disclosure.

Another method for mapping a logical channel to an MAC flow provided in the present disclosure, as shown in FIG. 2, mainly includes the following steps.

Step 201, an RNC informs a UE of at least one of the following parameters of an E-DCH MAC flow used by a CCCH through signaling: E-DCH MAC flow power offset, E-DCH MAC flow maximum number of retransmissions and a multiplexing indicator between different E-DCH MAC flows.

The signaling may be system broadcasting messages, such as system broadcasting message 5 and/or 5bis.

Step 202, the UE obtains at least one of the following parameters of the E-DCH MAC flow used by the CCCH from the signaling: E-DCH MAC flow power offset, E-DCH MAC flow maximum number of retransmissions and a multiplexing indicator between different E-DCH MAC flows.

The present disclosure further provides another method for mapping a logical channel to an MAC flow, which mainly includes the following steps.

Step 301, an RNC and a UE predetermines an identification of an E-DCH MAC flow used by a CCCH.

In practical application, the RNC and the UE may predetermine any of the E-DCH MAC flow identification 0~7 to be used by the CCCH.

Step 302, the UE obtains at least one of the following parameters of the HARQ profile corresponding to the identification from the signaling sent by the RNC according to the E-DCH MAC flow identifier used by the CCCH: E-DCH MAC flow power offset, E-DCH MAC flow maximum number of retransmissions and a multiplexing indicator between different E-DCH MAC flows.

The signaling may be system broadcasting messages, such as system broadcasting message 5 and/or 5bis.

Since corresponding relationship between an identification of an E-DCH MAC flow and an HARQ profile (including at least one of the following: E-DCH MAC flow power offset, E-DCH MAC flow maximum number of retransmissions and a multiplexing indicator between different E-DCH MAC flows) is also informed to the UE through the system broadcasting message 5 and/or system broadcasting message 5bis, thus the UE can obtain at least one of the following parameters from the corresponding HARQ profile according to the predetermined identification of the E-DCH MAC flow used by the CCCH:

E-DCH MAC flow power offset corresponding to an identification, E-DCH MAC flow maximum number of retransmissions and a multiplexing indicator between different E-DCH MAC flows.

To realize the above method for mapping a logical channel to an MAC Flow, the present disclosure provides a system for mapping a logical channel to an MAC flow, comprising an RNC and a UE. The RNC is configured to inform the UE of corresponding relationship between a CCCH and an E-DCH MAC flow through signaling. Accordingly, the UE is configured to receive the signaling, and obtain the corresponding relationship between the CCCH and the E-DCH MAC flow which is contained in the signaling. The RNC may make an identification of the E-DCH MAC flow included in the signaling, wherein the E-DCH MAC flow corresponding to the CCCH, the UE obtains at least one of the following parameters according to the identification: E-DCH MAC flow power offset corresponding to an identification, E-DCH MAC flow maximum number of retransmissions and a multiplexing indicator between different E-DCH MAC flows.

In addition, the RNC may directly inform the UE of the above parameters of the E-DCH MAC flow used by the CCCH (E-DCH MAC flow power offset corresponding to an identification, and/or E-DCH MAC flow maximum number of retransmissions, and/or a multiplexing indicator between different E-DCH MAC flows). Accordingly, the UE is configured to obtain related parameters of the E-DCH MAC flow used by the CCCH from the signaling.

The RNC and the UE may predetermine an identification of the E-DCH MAC flow used by the CCCH, and then the UE obtains at least one of the following parameters contained in the HARQ profile corresponding to the identification from the signaling sent by the RNC according to the identification of the E-DCH MAC flow used by the CCCH: E-DCH MAC flow power offset, E-DCH MAC flow maximum number of retransmissions and a multiplexing indicator between different E-DCH MAC flows.

In conclusion, with the present disclosure, it is convenient for both the NodeB and UE can obtain the corresponding relationship between the CCCH and the E-DCH MAC flow accurately, thus ensuring that the NodeB decodes correctly and improving the success rate in receiving signaling and data.

The above descriptions are preferred embodiments of the present disclosure, and are not used to limit the protection scope of the present disclosure.

The invention claimed is:

1. A method for mapping a logical channel to a Media Access Control (MAC) flow, comprising:
   a Radio Network Controller (RNC) informing a User Equipment (UE) of corresponding relationship between a Common Control Channel (CCCH) and an Enhanced Dedicated Channel (E-DCH) MAC flow through signaling; and
   the UE receiving the signaling, and obtaining the corresponding relationship between the CCCH and the E-DCH MAC flow,
   wherein the signaling including an identification of the E-DCH MAC flow corresponding to the CCCH;
   the UE obtaining at least one of the following parameters according to the identification: E-DCH MAC flow power offset corresponding to an identification, E-DCH MAC flow maximum number of retransmissions and a multiplexing indicator between different E-DCH MAC flows.

2. The method according to claim 1, wherein the signaling is system broadcasting message, and
   the RNC informing the UE of corresponding relationship between the CCCH and the E-DCH MAC flow through system broadcasting message.

3. A method for mapping a logical channel to a Media Access Control (MAC), comprising:
   a Radio Network Controller (RNC) informing a User Equipment (UE) of at least one of the following parameters of an Enhanced Dedicated Channel (E-DCH) MAC flow used by a Common Control Channel (CCCH) through signaling: E-DCH MAC flow power offset, E-DCH MAC flow maximum number of retransmissions and a multiplexing indicator between different E-DCH MAC flows; and
   the UE obtaining at least one of the following parameters of the E-DCH MAC flow used by the CCCH from the signaling: E-DCH MAC flow power offset, E-DCH MAC flow maximum number of retransmissions and a multiplexing indicator between different E-DCH MAC flows.

4. The method according to claim 3, wherein the signaling is system broadcasting message, and the RNC informing the UE of the parameters of the E-DCH MAC flow used by the CCCH though system broadcasting message.

5. A method for mapping a logical channel to a Media Access Control (MAC), comprising:
a Radio Network Controller (RNC) and a User Equipment (UE) predetermining an identification of an Enhanced Dedicated Channel (E-DCH) MAC flow used by a Common Control Channel (CCCH);
the UE obtaining at least one of the following parameters corresponding to the identification from signaling sent by the RNC according to the identification of the E-DCH MAC flow used by the CCCH: E-DCH MAC flow power offset, E-DCH MAC flow maximum number of retransmissions and a multiplexing indicator between different E-DCH MAC flows.

6. The method according to claim 5, wherein the signaling is system broadcasting message, and
the UE obtaining at least one of the following parameters corresponding to the identification from system broadcasting message sent by the RNC according to the identification of the E-DCH MAC flow used by the CCCH: E-DCH MAC flow power offset, E-DCH MAC flow maximum number of retransmissions and a multiplexing indicator between different E-DCH MAC flows.

7. A system for mapping a logical channel to a Media Access Control (MAC), comprising a Radio Network Controller (RNC) and a User Equipment (UE), wherein
the RNC is configured to inform the UE of corresponding relationship between a Common Control Channel (CCCH) and an Enhanced Dedicated Channel (E-DCH) MAC flow through signaling;
the UE is configured to receive the signaling and obtain the corresponding relationship between the CCCH and the E-DCH MAC flow.

8. The system according to claim 7, wherein the RNC makes an identification of the E-DCH MAC flow included in the signaling, wherein the E-DCH MAC flow is corresponding to the CCCH; the UE obtains at least one of the following parameters according to the identification:
E-DCH MAC flow power offset corresponding to an identification, E-DCH MAC flow maximum number of retransmissions and a multiplexing indicator between different E-DCH MAC flows.

9. The system according to claim 7, wherein the signaling is system broadcasting message, and
the RNC is further configured to inform the UE of corresponding relationship between the CCCH and the E-DCH MAC flow through system broadcasting message.

10. A system for mapping a logical channel to a Media Access Control (MAC), comprising a Radio Network Controller (RNC) and a User Equipment (UE), wherein
the RNC is configured to inform the UE of at least one of the following parameters of an Enhanced Dedicated Channel (E-DCH) MAC flow used by a Common Control Channel (CCCH) through signaling: E-DCH MAC flow power offset, E-DCH MAC flow maximum number of retransmissions and a multiplexing indicator between different E-DCH MAC flows;
the UE is configured to obtain at least one of the following parameters of the E-DCH MAC flow used by the CCCH from the signaling: E-DCH MAC flow power offset, E-DCH MAC flow maximum number of retransmissions and a multiplexing indicator between different E-DCH MAC flows.

11. The system according to claim 10, wherein the signaling is system broadcasting message, and
the RNC is further configured to inform the UE of the parameters of the E-DCH MAC flow used by the CCCH though system broadcasting message.

12. A system for mapping a logical channel to a Media Access Control (MAC), comprising a Radio Network Controller (RNC) and a User Equipment (UE), wherein
the RNC is configured to predetermine an identification, with the UE, of an Enhanced Dedicated Channel (E-DCH) MAC flow used by a Common Control Channel (CCCH);
the UE is configured to predetermine the identification, with the RNC, of the E-DCH MAC flow used by the CCCH and obtain at least one of the following parameters corresponding to the identification from signaling sent by the RNC according to the identification: E-DCH MAC flow power offset, E-DCH MAC flow maximum number of retransmissions and a multiplexing indicator between different E-DCH MAC flows.

13. The system according to claim 12, wherein the signaling is system broadcasting message, and
the UE is further configured to obtain at least one of the following parameters corresponding to the identification from system broadcasting message sent by the RNC according to the identification: E-DCH MAC flow power offset, E-DCH MAC flow maximum number of retransmissions and a multiplexing indicator between different E-DCH MAC flows.

14. The system according to claim 8, wherein the signaling is system broadcasting message, and
the RNC is further configured to inform the UE of corresponding relationship between the CCCH and the E-DCH MAC flow through system broadcasting message.

* * * * *